(No Model.)
R. B. HOUGH.
PIPE VISE.
No. 600,830.
Patented Mar. 15, 1898.
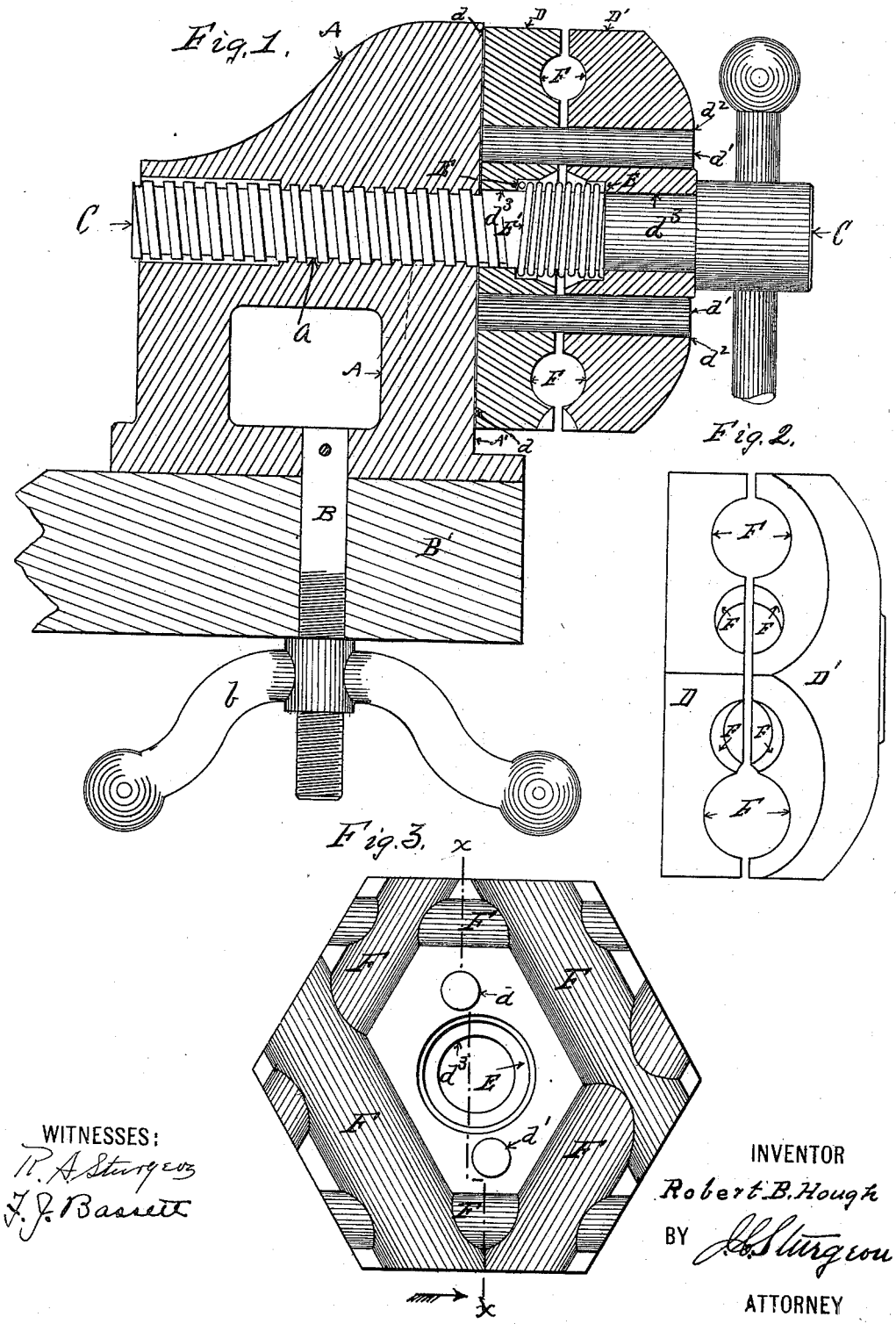
WITNESSES:
R. A. Sturgeon
J. J. Bassett
INVENTOR
Robert B. Hough
BY
J. S. Sturgeon
ATTORNEY

UNITED STATES PATENT OFFICE.

ROBERT B. HOUGH, OF ERIE, PENNSYLVANIA, ASSIGNOR TO THE HOLLANDS MANUFACTURING COMPANY, OF SAME PLACE.

PIPE-VISE.

SPECIFICATION forming part of Letters Patent No. 600,830, dated March 15, 1898.

Application filed January 5, 1897. Serial No. 618,016. (No model.)

*To all whom it may concern:*

Be it known that I, ROBERT B. HOUGH, a citizen of the United States, residing at the city of Erie, in the county of Erie and State of Pennsylvania, have invented certain new and useful Improvements in Pipe-Vises; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to pipe-vises; and it consists, primarily, in a frame adapted to be secured to a bench provided with a pair of rotatable jaws having a series of grooves of different sizes in their meeting faces and provided with means to insure their rotation in unison with each other.

The other features of this invention are hereinafter set forth and described, and illustrated in the accompanying drawings, in which—

Figure 1 is a vertical longitudinal section of my improved pipe-vise on the line $x\ x$ in Fig. 3. Fig. 2 is a side elevation of the rotatable jaws of the same. Fig. 3 is a view in elevation of the face of one of the rotatable jaws of the vise.

In the drawings thus illustrating this invention, A is the vise-frame, provided with a downwardly-projecting stud B, with a hand-nut $b$ thereon, whereby the vise-frame A may be secured to a bench B' or other suitable support and adjusted thereon as may be desired. The front of this frame A is provided with a vertical face A' and a horizontal screw-threaded opening $a$ through the center thereof, in which a vise-screw C operates. On this screw C are mounted rotatable jaws D D', which in the drawings are shown as hexagonal, but which may be of any convenient shape. One of these jaws, D, is provided with a face $d$, adapted to fit against the face A' of the vise-frame, and with stud-pins $d'\ d'$, which project from the front thereof into holes $d^2\ d^2$ in the corresponding jaw D', so that the jaws D and D' will at all times rotate in unison. Through the centers of the jaws D D' are openings $d^3$, through which the shank of the vise-screw C passes. Around these openings $d^3$ the meeting faces of the jaws D D' are chambered out at E E, so as to receive a spring E', which surrounds the shank of the vise-screw C and operates to force the meeting faces of the jaws apart when the vise-screw C is moved back.

I make corresponding semicircular grooves F of different sizes in the meeting faces of the jaws D D', so that each corresponding pair of grooves will grip a different-sized pipe.

From the foregoing description it is obvious that the operator can quickly rotate the jaws D D' as desired, so as to bring any desired sized groove uppermost, so as to grip and hold any particular sized pipe desired.

It is obvious that the construction of this device may be considerably varied by those skilled in the art to which it appertains without departing from the spirit of my invention.

Therefore, having fully described my invention, so as to enable others to construct and use the same, what I claim as new, and desire to secure by Letters Patent of the United States, is—

1. The combination in a pipe-vise, of a vise-frame, means for adjustably securing the same to a bench or other suitable support, a vise-screw operating in said frame, a pair of rotatable jaws mounted on and supported by said vise-screw, having corresponding grooves in their meeting faces, stud-pins in one of the jaws operating in corresponding holes in the other jaw, and a spiral spring between said jaws, substantially as and for the purpose set forth.

2. The combination in a pipe-vise, of a vise-frame A, provided with a stud B and hand-nut $b$, a vise-screw C operating in said frame, jaws D D' mounted and rotatable on the shank of said screw, stud-pins $d'$ in the jaw D operating in holes $d^2$ in the jaw D', a spring E operating between said jaws, and a series of different-sized grooves F in the meeting faces of the jaws, substantially as and for the purpose set forth.

In testimony whereof I affix my signature in presence of two witnesses.

ROBERT B. HOUGH.

Witnesses:
F. J. BASSETT,
FRED EINFELDT.